No. 763,746.

Patented June 28, 1904.

UNITED STATES PATENT OFFICE.

ANDREW L. GINTER, OF NEWARK, NEW JERSEY.

COMPOSITION OF MATTER FOR CEMENT.

SPECIFICATION forming part of Letters Patent No. 763,746, dated June 28, 1904.

Application filed April 19, 1904. Serial No. 203,900. (No specimens.)

*To all whom it may concern:*

Be it known that I, ANDREW L. GINTER, a citizen of the United States, residing at Newark, in the county of Essex and State of New Jersey, have invented certain new and useful Improvements in Composition of Matter for Cement; and I do hereby declare the following to be a full, clear, and exact description of the invention, such as will enable others skilled in the art to which it appertains to make and use the same.

This invention relates to a novel composition of matter for a cement which shall be waterproof and which may be applied for its intended uses and purposes either out of or beneath the surface of a body of water; and the invention has for its primary objects to provide a useful and cheaply-made cement of the character hereinafter more particularly specified which can be used with roofs of the various kinds and may be employed with tin, iron, slate, tiling, gravel, glass, and, in fact, the cement may be variously used for cementing together any material, whether metal or otherwise, and either out of or beneath the surface of a body of water, as with boats and other similar vessels.

The invention consists, therefore, in the novel composition of matter for a cement, all of which will be more fully set forth in the following specification and then finally embodied in the clauses of the claim, which are appended to and form an essential part of the said specification.

My composition consists, substantially, of the following ingredients, viz: ferric oxid, commonly known as "prince metallic," japan, varnish, oil of citronelli, white lead, coal-tar, naphtha, and fish-oil.

In place of the ferric oxid any other suitable iron oxid or oxysalts may be used; but the oxid known to the trade as "prince metallic" is preferred.

To the above-stated mixture or composition of matter I may add ground slate, and various kinds of coloring-matter or pigments may also be added, if desired.

In place of the use of japan I may substitute linseed-oil, or some linseed-oil may be added directly to the japan, if desired.

The above-named ingredients are thoroughly mixed or mingled in a mixer, and may be combined in the following proportions, viz: prince metallic, five hundred pounds; japan, fifty pounds; white lead, one hundred pounds; varnish, three gallons; oil of citronelli, three gallons; coal-tar, ten gallons; naphtha, one gallon; fish-oil, five gallons.

Of course it will be understood that I do not limit my invention to the exact combination of the ingredients as above specified, nor do I confine myself to the exact proportions of the ingredients named, for I am fully aware that the said combination of ingredients, as well as the proportions of the same, may be varied and departed from without in the least departing from the scope of my present invention, and some of the ingredients may be omitted or others substituted therefor. By the use of the said composition of matter I have produced a perfectly waterproof cement and one which can be applied to an object or body located beneath the surface of a body of water, the said composition of matter when applied becoming thoroughly hardened while in the water.

Having thus described my invention, what I claim is—

1. A composition of matter for producing a cement consisting of a mixture of prince metallic, japan, varnish, coal-tar, white lead, naphtha and an oil, substantially as described.

2. A composition of matter for producing a cement consisting of a mixture of prince metallic, japan, varnish, oil of citronelli, white lead, coal-tar, naphtha and fish-oil, substantially as described.

3. A composition of matter for producing a cement consisting of a mixture of prince metallic, japan, varnish, oil of citronelli, white lead, coal-tar, naphtha, fish-oil, and ground slate, substantially as described.

4. The herein-described composition of matter for producing a cement consisting of prince metallic five hundred pounds, japan fifty pounds, white lead one hundred pounds, varnish three gallons, oil of citronelli three gallons, coal-tar ten gallons, naphtha one gallon, and fish-oil five gallons, substantially as described.

5. The herein-described composition of matter for producing a cement consisting of prince metallic five hundred pounds, japan fifty pounds, white lead one hundred pounds, varnish three gallons, oil of citronelli three gallons, coal-tar ten gallons, naphtha one gallon, fish-oil five gallons, and an addition of ground slate, substantially as described.

In testimony that I claim the invention set forth above I have hereunto set my hand this 18th day of April, 1904.

ANDREW L. GINTER.

Witnesses:
GEO. E. SCHEIDER,
CHARLES FLAMM.